(12) United States Patent
Loehden et al.

(10) Patent No.: US 7,868,098 B2
(45) Date of Patent: Jan. 11, 2011

(54) PROCESS FOR PREPARING (METH) ACRYLATE-BASED ABA TRIBLOCK COPOLYMERS

(75) Inventors: Gerd Loehden, Essen (DE); Sven Balk, Hanau (DE); Monika Maerz, Alzenau (DE); Christine Troemer, Hammersbach (DE)

(73) Assignee: Evonik Roehm GmbH, Darmstadt (DE)

( * ) Notice: Subject to any disclaimer, the term of this patent is extended or adjusted under 35 U.S.C. 154(b) by 203 days.

(21) Appl. No.: 11/997,621

(22) PCT Filed: Aug. 30, 2006

(86) PCT No.: PCT/EP2006/065790
§ 371 (c)(1),
(2), (4) Date: Feb. 1, 2008

(87) PCT Pub. No.: WO2007/033887
PCT Pub. Date: Mar. 29, 2007

(65) Prior Publication Data
US 2008/0262176 A1    Oct. 23, 2008

(30) Foreign Application Priority Data
Sep. 22, 2005    (DE) .................. 10 2005 045 458

(51) Int. Cl.
*C08F 291/00*    (2006.01)
(52) U.S. Cl. .................. 525/245; 525/88; 525/165; 525/301; 525/302; 525/309; 525/418; 525/451; 525/902
(58) Field of Classification Search .......... 525/165, 525/88, 245, 301, 302, 308, 309, 418, 451, 525/902
See application file for complete search history.

(56) References Cited

U.S. PATENT DOCUMENTS

| | | | |
|---|---|---|---|
| 5,794,403 A | 8/1998 | Oberlander et al. | |
| 6,498,209 B1 | 12/2002 | Loehden et al. | |
| 6,566,441 B1 | 5/2003 | Lohden et al. | |
| 6,809,163 B2 | 10/2004 | Schultes et al. | |
| 6,989,409 B2 | 1/2006 | Loehden et al. | |
| 7,049,355 B2 | 5/2006 | Quis et al. | |
| 7,056,983 B2* | 6/2006 | Nakagawa et al. | 525/242 |
| 2004/0116567 A1 | 6/2004 | Schmitt et al. | |
| 2005/0085592 A1* | 4/2005 | Taniguchi et al. | 525/242 |
| 2007/0068088 A1 | 3/2007 | Einfeldt et al. | |
| 2007/0117948 A1 | 5/2007 | Loehden et al. | |
| 2007/0193156 A1 | 8/2007 | Kautz et al. | |
| 2007/0193159 A1 | 8/2007 | Schattka et al. | |
| 2007/0193478 A1 | 8/2007 | Schattka et al. | |
| 2007/0196655 A1 | 8/2007 | Schattka et al. | |
| 2007/0197671 A1 | 8/2007 | Schattka et al. | |
| 2007/0197689 A1 | 8/2007 | Kautz et al. | |
| 2007/0197690 A1 | 8/2007 | Schattka et al. | |
| 2007/0197691 A1 | 8/2007 | Kautz et al. | |
| 2007/0204543 A1 | 9/2007 | Schattka et al. | |
| 2007/0204544 A1 | 9/2007 | Kautz et al. | |
| 2007/0208107 A1 | 9/2007 | Schattka et al. | |
| 2007/0208109 A1 | 9/2007 | Kautz et al. | |
| 2007/0259987 A1 | 11/2007 | Schattka et al. | |
| 2008/0057205 A1 | 3/2008 | Lohden et al. | |
| 2008/0292893 A1 | 11/2008 | Loehden et al. | |
| 2009/0048401 A1 | 2/2009 | Loehden et al. | |

FOREIGN PATENT DOCUMENTS

| | | | |
|---|---|---|---|
| JP | 2003-227572 | * | 10/2003 |
| JP | 2003 277572 | | 10/2003 |

OTHER PUBLICATIONS

Mennicken, M.; Nagelsdiek, R.; Keul, H.; Hocker, H.; Macromolecular Chemistry and Physics, 2004, vol. 205, p. 2429-2437.*

Lodge, T.P.; Macromolecular Chemistry and Physics, 2003, vol. 204, p. 265-273.*

Szamel, G.; Muller, M.; Journal of Chemical Physics, 2003, vol. 118, No. 2, p. 905-913.*

U.S. Appl. No. 12/522,269, filed Jul. 7, 2009 Balk et al.

Liwei Zhang, et al., "Allyl Functionalized Telechelic Linear Polymer and Star Polymer Via Raft Polymerization", Polymer, vol. 47, XP 002403864, pp. 5259-5266, 2006.

Dotsevi Y. Sogah, et al., "Group Transfer Polymerization. Polymerization of Acrylic Monomers", Macromolecules, vol. 20, No. 7, XP 002403865, pp. 1473-1488, 1987.

U.S. Appl. No. 12/441,664, filed Mar. 17, 2009, Schattka et al.
U.S. Appl. No. 12/290,880, filed Nov. 4, 2008, Enfeldt et al.
U.S. Appl. No. 12/373,531, filed Jan.13, 2009, Schattka et al.

*Primary Examiner*—David Wu
*Assistant Examiner*—Robert Jones, Jr.
(74) *Attorney, Agent, or Firm*—Oblon, Spivak, McClelland, Maier & Neustadt, L.L.P.

(57) ABSTRACT

The invention relates to a process for preparing (meth)acrylate-based ABA triblock copolymers with an olefinic functionalization of the A blocks.

11 Claims, No Drawings

PROCESS FOR PREPARING (METH) ACRYLATE-BASED ABA TRIBLOCK COPOLYMERS

The invention relates to a process for preparing (meth) acrylate-based ABA triblock copolymers with an olefinic functionalization of the A blocks and to their use for example as prepolymer for polymer-analogous reactions or as binders in sealants.

Tailor-made copolymers with defined composition, chain length, molar mass distribution, etc. are a broad field of research. One of the distinctions made is between gradient polymers and block polymers. A variety of applications are conceivable for such materials. A number of them will briefly be presented below.

Block polymers have a sharp transition between the monomers in the polymer chain, which is defined as a boundary between the individual blocks. A typical synthesis process for AB block polymers is the controlled polymerization of monomer A and, at a later point in time, the addition of monomer B. Besides sequential polymerization by batchwise addition to the reaction vessel, a similar result can also be obtained by sharply altering the compositions of the two monomers, in the case of their continuous addition, at defined points in time.

As living or controlled polymerization methods, anionic polymerization or group-transfer polymerization is also accompanied by modern methods of controlled radical polymerization such as, for example, RAFT polymerization. The mechanism of RAFT polymerization is described in more detail in WO 98/01478 or EP 0 910 587. Application examples are found in EP 1 205 492.

A new mode of polymerization brought the art a good deal closer to the aim of tailor-made polymers. The ATRP method (atom transfer radical polymerization) was developed in the 1990s definitively by Prof. Matyjaszewski (Matyjaszewski et al., J. Am. Chem. Soc., 1995, 117, p. 5614; WO 97/18247; Science, 1996, 272, p. 866). ATRP yields narrowly distributed (homo)polymers in the molar mass range of $M_n$=10 000-120 000 g/mol. A particular advantage here is that both the molecular weight and the molecular weight distribution can be regulated. As a living polymerization, furthermore, it allows the targeted construction of polymer architectures such as, for example, random copolymers or else block copolymer structures. By means of corresponding initiators it is additionally possible to access, for example, unusual block copolymers and star polymers. Theoretical principles relating to the polymerization mechanism are elucidated in references including Hans Georg Elias, Makromolekule, Volume 1, 6th Edition, Weinheim 1999, p. 344.

Controlled-growth free-radical methods are also suitable particularly for the targeted functionalization—such as for the termination, for example—of vinyl polymers. Particular interest attaches here to olefinic functions, among others.

One particularly important field of application for vinyl polymers having terminal functional groups are crosslinkable formulations which are able to encompass diverse application sectors. These applications embrace not only the direct use of the products, as described for example in Moeller et al. (Polymer Preprints; 46, p. 341f; 2005) for polymethacrylates with non-terminal olefinic functionalization, but also the polymer-analogous addition to give, for example, silyl, hydroxyl or epoxy functions, which via corresponding reactions can find application in a crosslinkable formulation. Hydrosilyl-functionalized compounds are crosslinkable with water fractions—from the atmospheric moisture, for example. Hydroxyl functions can be reacted, for example, in the formulation with polymers containing isocyanate groups, and epoxy-containing compounds by means of the far-reaching diversity of known reactions involving ring opening. As a second component in a formulation of this kind it is possible to make use for example of polyurethanes, polyamides, polyethers such as polyethylene oxide or polypropylene oxide, polyolefins such as polybutadiene or polyisoprene, or else polyesters such as polyethylene terephthalate or polycaprolactone. The most widespread in respect of sealants in construction applications, however, are silicones, which are crosslinked via corresponding hydrosilyl groups.

All of these polymers described are prepared either by way of ionic addition polymerization processes or by polycondensation and/or polyaddition. In these processes the preparation of end group-functionalized products is unproblematic. In contrast, the targeted functionalization at the chain end is virtually impossible in the case of free-radical addition polymerization. Accordingly, polystyrenes or polymethacrylate have to date played only a minor part in respect of applications as formulation constituents for sealants used in the construction industry. One possibility for preparing such products has been added, however, with the development of controlled-growth free-radical addition polymerization methods such as, for example, that of ATRP. Accordingly these monomers too are now available for the construction of corresponding polymer architectures.

A further possible application for olefinically terminated polymers is the aim of forming hydrogels, for example, in a suitable formulation. This application is described in more detail in US 2005/0113543. A problem with terminated polymers of this kind, however, is that the gelling operation takes a long time because of the low concentration of reactive groups. A further disadvantage is that, in the case of free-radically polymerized products, the viscosity prior to gelling is decidedly high and may therefore lead to an additional brake on the process.

One possibility of providing poly(meth)acrylates synthesized by ATRP with olefinic functionalization on the end groups is described in US 2005/0113543. Disadvantages of this process, in which one olefinic group is introduced by an unsaturated initiator and the other by substitution of the halogenated chain end by organotin compounds, involving transfer of an allyl group, are the unavoidable multi-stage character of the process, the use of toxicological objectionable tin compounds, and a monofunctional initiation, which rules out the synthesis of symmetrical ABA triblock copolymers of the invention.

The synthesis of symmetrically constructed, terminated poly(meth)acrylates with bifunctional initiators, involving subsequent substitution of the terminal halogen atoms by unsaturated alkoxides, is described in EP 0 976 766 or EP 1 179 567 and also in U.S. Pat. No. 6,274,688. Here again a clear disadvantage is to be seen in the two-stage nature of the process. Moreover, the targeted synthesis of block copolymers, and especially triblock copolymers, is not part of the invention. Instead, the recited patents specifically describe the preparation of homopolymers or copolymers having a random distribution.

The application of a single-stage process for the synthesis of olefinically terminated poly(meth)-acrylates is described in EP 1 085 027. By adding non-conjugated dienes to a polymerization solution initiated using a bifunctional ATRP initiator, the polymerization is discontinued and the product is terminated. The method is described in greater precision in EP 1 024 153 and EP 1 153 942. Those publications also describe the use of the materials as an intermediate to a further reaction to give silyl-terminated products. In relation to the hydrosilylation of the products and to formulations which are used with subsequent crosslinking to sealants, a more precise description is found in EP 1 153 942- and a current description of the process is claimed in EP 1 498 433. All of these descriptions propose exclusively purely terminated products. None of the polymers described has a block structure.

A disadvantage of these products as compared with polymers having multiply functionalized, short outer blocks is the greater probability of obtaining products without functionalization at one end. A further disadvantage is to be seen in the incomplete reaction in subsequent reactions such as a hydrosilylation, for example. In both cases, for further, subsequent reactions, such as, for example, in the operation of curing sealant formulations, a relatively low degree of crosslinking is obtained, which counteracts the mechanical stability and chemical stability.

A further advantage of the block copolymers of the invention over the terminated products is an improved crosslinkability in sealant formulations. This crosslinkability is improved by distribution of the functionalities in the end segments. In addition, however, excessively tight crosslinking is ruled out by a distribution of the reactive groups to the end segments. By end segment is meant a chain section which accounts in each case for not more than 20% by mass, preferably not more than 10% by mass and very preferably not more than 5% by mass of the overall polymer chain. A disadvantage of free-radically prepared binders of this kind would be a random distribution of the functional groups in the polymer chain. That leads to a tight crosslinking and hence to reduced elasticity on the part of the sealant. Furthermore, impairment of substrate bonding may also result.

Although unlikely in the case of a reaction with a pure terminating reagent, EP 1 024 153 reports a degree of functionalization $\geq 2$. Should such a product be available via that synthesis pathway, then it can only be a polymer having two or more diene units at the chain end. The direct spatial vicinity of the two units, however, cannot be regarded as adequate compensation for the disadvantages described above.

EP 1 179 545 proposes various terminations of the polymer for the purpose of producing sealants which comprise, inter alia, a (meth)acrylate-based binder. For instance, unsaturated chain ends are engaged by substitution of the halogenated termini with ionic reagents, and they are either hydrosilylated prior to the crosslinking reactions or crosslinked as they are with acrylate groups on the coformulation agent. Also described is the substitution to OH-terminated products, which are coformulated with diisocyanates. It is common knowledge, however, that OH-bearing end groups of this kind, which are usually aromatic, are often unstable. Furthermore, the products described in this specification are also subject to the disadvantages described above, namely an exclusive termination and a necessary two-stage synthesis with a polymer-analogous reaction in the second step.

EP 1 158 006 expands the termination concepts described, in a multiplicity of respects: on the one hand, the group of the reagents suitable for termination is extended to include cyclic dienes such as, for example, cyclooctadienes. With this supplementation, however, there is no corresponding extension to the polymer architecture apparent. On the other hand, there is a description of the supplementation of the polymer-analogous reactions—such as the above-described hydrosilylation—to include addition reactions to give OH— and/or amine-terminated polymers, and to include epoxidations. These reactions are per se not new. Accordingly, such reactions can also be performed analogously with the functionalized ABA triblock copolymers described in the present specification.

Polymers obtained by a free-radical addition polymerization process often exhibit molecularity indices of well above 1.6. In the case of a molecular weight distribution of this kind, therefore, there are unavoidably very short-chain polymers and extremely long-chain polymers in the product as a whole. The short-chain by-products can adversely affect the chemical stability of the product. Long-chain by-products, in contrast, lead to a disproportionate increase in the viscosity of the polymer melt or polymer solution. This effect is in no way compensated by the broad-distribution chains of low molecular mass which are effective as plasticizers in certain circumstances. These disadvantages of free-radically polymerized, (meth)acrylate-based binders can be done away with by the ability, through the use of a controlled polymerization method, in the form of atom transfer radical polymerization, to make binders available which have very narrow molecular weight distributions and which, as a result of as compared with free-radically polymerized (meth)acrylates, have a low fraction of high molecular mass constituents. In polymer mixtures in particular these constituents bring about an increase in the viscosity.

Besides ATRP, other methods too are employed for the synthesis of olefinically functionalized polymer architectures. The two relevant methods will be described briefly below. In this context there is a delimitation from the present invention in terms of the products and also the methodology. Particular emphasis is given here to the advantages of ATRP over other processes:

DE 38 32 466 describes, among other things, the preparation of P(AMA)-(MMA)-(AMA) triblock copolymers by means of group transfer polymerization (GTP). On the one hand, GTP has now proved to be of little industrial interest, owing to the susceptibility of the process to contamination and owing to the high costs associated with the process. On the other hand, the patent specification describes exclusively block copolymers containing AMA homopolymer blocks. With the materials described in the patent specification, however, it is readily apparent to the skilled person that these polymers tend readily towards premature crosslinking reactions and hence cannot be stable on storage even when stabilized.

Products very similar to those described in the present invention are presented in EP 1 268 591. The products in question have a variety of block copolymer architectures, which in one block may contain, inter alia, allyl methacrylate, as a reactive unit, via the interim formation of micelles for further reaction to form microgels. The predominant fraction of the architectures presented, however, comprises AB diblock copolymers featuring a sharply differing solubility of the two blocks in the solvent surrounding the materials. To any skilled person it is readily apparent that AB diblock structures in particular are of significance for the formation of such microgels. The listing of ABA triblock architectures therefore appears not to be inventive. The invention cited also differs from the present invention in that, with regard to the polymers described in the present text, a large difference in solubility between the blocks is not wanted and is in fact harmful. Gelling, as deliberately brought about in EP 1 268 591, is unambiguously unwanted in the context of the use of the triblock copolymers of the invention. A third critical difference from EP 1 268 591 lies in the method used. The cited text describes exclusively products polymerized by means of reversible addition-fragmentation chain transfer (RAFT). This method, which is likewise a controlled-growth free-radical polymerization method, is clearly different from the ATRP used in this invention. Initiators in the RAFT are exclusively sulphur compounds, which are incorporated at the chain end and/or, in the case of multifunctional initiators, in the middle of the chain. Disadvantages of this method are the strongly odorous initiators, which if incompletely converted must be removed, which is inconvenient, and the incorporation of the sulphur fragment into the chain. In certain circumstances this fragment may reduce the thermal durability of the polymer. When ATRP is employed, however, exclusively initiator fragments, which like the monomers used are composed of the elements carbon, hydrogen and oxygen, are incorporated into the polymer chain.

A further delimitation from EP 1 268 591 is accomplished via the composition of the functionalized blocks. Whereas in the polymers of the invention the aim is for extremely low fractions of the reactive groups, there are no more precise details of this in EP 1268591. It can be assumed, however, that the number of these groups for the formation of a microgel can be or should be greater. This aspect is made clear as well, in particular, by the markedly different starting points of EP 1 268 591 and the present invention.

A new stage in the development are the triblock copolymers described below. A distinction is made between ABC and ABA triblock copolymers.

ABA triblock copolymers are to be equated in turn with 5-block copolymers of composition ACBCA.

It was an object to prepare triblock polymers of structure ABA. In particular there is a need for olefinically terminated poly(meth)acrylates and/or poly(meth)acrylates which in terms of their properties match or come very close to olefinically terminated materials. This can be achieved, for example, through the incorporation of one to a few units having olefinic groups at the chain end whose polymerization activity is low or zero. Chain ends are used as a term for the end segment of a polymer, accounting for not more than 1-20% by weight of the total weight of the polymer.

Poly(meth)acrylates which carry unsaturated chain ends, or unsaturated terminated poly(meth)acrylates, have suitability as prepolymers for crosslinkings, for further reaction of the chain ends, with the objective of attaching functionalities which were hitherto inaccessible, or e.g. for specific biological reactions.

A further object of the invention is to provide polymers contained reactive olefinic functionalities, as binders, in such a way that the number of such groups in the polymer, while retaining effective availability for the curing reaction, is minimized. A relatively high fraction of polar groups in the binder leads to possible gelling or at least to an additional increase in the solution or melt viscosity. This object can be achieved by the controlled attachment of the functionalities at the chain end or in its vicinity.

This invention further provides for the functionalization of short A blocks in ABA triblock copolymers through the incorporation of suitable diunsaturated monomers during the last stage of a sequential polymerization. Critical to the success of this process is that the two olefinic groups of the monomer have different polymerization activities.

A further object is to provide a material having a very narrow molecular weight distribution of less than 1.6, preferably less than 1.4. This minimizes not only the fractions of relatively high molecular mass constituents, whose effects include contributing to an unwanted increase in solution or melt viscosity, but also the fractions of particularly low molecular mass constituents, which can induce deterioration in the solvent resistance of the binder.

In view of the identified and discussed prior art, one of the underlying objects was that of providing a formulation constituent for sealants which has a large initial strength without occurrence of premature gelling. Moreover, the intention was to achieve a reduction in the viscosity, and/or in the stability of viscosity of the melt or of a solution of the binder at a given processing temperature, for the purpose of enhancing the processing properties. The objects related, furthermore, among others, to only a small fraction of extractable components in the cured sealant, and to very good adhesion properties with respect to a large number of different materials.

It is an object of the present invention, therefore, among others, to provide a binder for sealants that either is olefinically terminated or else has a small number of free unsaturated groups in the vicinity of the chain ends. When formulated in sealants, such materials feature higher elasticity. This also results in an improvement in adhesion to the substrate.

The object has been achieved by the making available of block copolymers of composition ABA having $\leq 4$ olefinic groups in the individual A blocks, characterized in that block A, a copolymer containing olefinically functionalized (meth) acrylates and monomers selected from the group of (meth) acrylates or mixtures thereof and one block B, containing (meth)acrylates or mixtures thereof which have no additional olefinic function, are polymerized as ABA block copolymers.

It has been found that ABA block copolymers having $\leq 2$ unsaturated groups in the individual A blocks can also be prepared.

Both to the copolymers of block A and to the copolymers of block B it is possible to add 0-50% by weight of ATRP-polymerizable monomers which are not included in the group of (meth)acrylates.

One preferred embodiment is represented by block copolymers which, with an ABA composition, have $\leq 4$ olefinic groups in the individual A blocks and where the block A, a copolymer containing olefinically functionalized (meth) acrylates and monomers selected from the group of (meth) acrylates or mixtures thereof and, optionally, further, ATRP-polymerizable monomers which are not included in the group of (meth)acrylates, and one block B, containing (meth)acrylates or mixtures thereof which have no olefinic function and, optionally, further, ATRP-polymerizable monomers which are not included in the group of (meth)acrylates, are polymerized as ABA block copolymers, it also being possible for the ATRP-polymerizable monomers to be copolymerized only in block A or to be copolymerized only in block B.

A further service of the present invention is to describe, in parallel therewith, block copolymers having AMA fractions which overall are much lower, and to describe this monomer for the first time as part of a non-crosslinked copolymer which can be used in subsequent reactions for the preparation of further functionalities at the ends of the polymer chain.

As compared with the formulations described in the prior art having olefinically terminated binders in the formulation, the advantage of an improved crosslink-ability can also be seen in the products of the invention, with a relevantly higher degree of functionalization. As a result of the large number of reactive groups in the chain end segment, reaction of the unsaturated groups is more likely, and crosslinking to a comparably close-knit elastomer or to flexible sealant proceeds at a significantly faster rate.

The possible applications of the materials of the invention include, however, not only binders for sealants or as intermediate for the introduction of other kinds of functionalities. EP 1 510 550, for example, describes a coating composition composed, among other things, of acrylate particles and polyurethanes. A polymer of the invention in a corresponding formulation led to an improvement in the processing properties and to a further alternative of a crosslinking mechanism. Conceivable applications would include, for example, powder coating formulations.

The spectrum of possible applications of polymer-analogous subsequent reactions is very great and may be illustrated using U.S. Pat. No. 8,866,742 as an example. That text describes the random and free-radical copolymerization of MMA and allyl methacrylate. The disadvantages of such a product have already been addressed elsewhere. Subsequently, however, these products are hydro-silylated with silyl radicals having a high steric bulk. A specified application is as fillers in dental medicine. This subsequent functionalization of the polymers differs from the present invention in that linkage is exclusively of silyl radicals composed of a minimum of 12 silicon atoms. The purpose of the present oligosilyl radicals is also distinctly different from a polymer of the invention which, following subsequent hydrosilylation with a silane containing only one Si atom, serves as a reactive component in a crosslinkable formulation.

The components used for the hydrosilylation are distinguished by the following general formula:

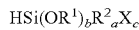
$$HSi(OR^1)_b R^2_a X_c$$

In this formula the organic radicals $R^1$ and $R^2$ may each be identical or different from one another. Additionally the organic radicals $R^1$ and $R^2$ are selected from the group of aliphatic hydrocarbon radicals consisting of 1 to 20 carbon atoms. These groups may alternatively be linear, branched or cyclic. $R^1$ here may also be exclusively hydrogen.

X is selected from the group of hydrolysable radicals other than alkoxy and hydroxyl. This group embraces, among other groups, halogen, acyloxy, amino, amido, mercapto, alkenyloxy and similar hydrolysable groups.

Examples that may be recited include $HSiCl_3$, $HSiMeCl_2$, $HSiMe_2Cl$, $HSi(OMe)_3$, $HSiMe(OMe)_2$, $HSiMe_2(OMe)$, $HSi(OPh)_3$, $HSiMe(OPh)_2$, $HSiMe_2(OPh)$, $HSi(OEt)_3$, $HSiMe(OEt)_2$, $HSiMe_2(OEt)$, $HSi(OPr)_3$, $HSiMe(OPr)_2$, $HSiMe_2(OPr)$, $HSiEt(OMe)_2$, $HSiEtMe(OMe)$, $HSiEt_2(OMe)$, $HSiPh(OMe)_2$, $HSiPhMe(OMe)$, $HSiPh_2(OMe)$, $HSiMe(OC(O)Me)_2$, $HSiMe_2(OC(O)Me)$, $HSiMe(O-N=CMe_2)_2$ or $HSiMe_2(O-N=CMe_2)$. The abbreviations here are as follows: Me for methyl, Ph for phenyl, Et for ethyl, and Pr for isopropyl or n-propyl.

Additionally, a, b and c are each integers between 0 and 3. The sum a+b+c is 3.

Hydrosilylations of double bonds have long been prior art. The hydrosilylation of double bonds attached to polymers has also been described in many instances previously. More recent examples are to be found in DE 28 51 456, EP 0 994 172 or EP 1 024 153. The hydrosilylation is made possible as a result of the addition of a suitable catalyst. In accordance with the invention it is possible to use any catalyst suitable for this purpose, individually or in a mixture with other suitable catalysts. The catalysis may be performed either homogeneously or heterogeneously by means of catalysts bound to a support material such as Alox or silica.

Some few examples of catalysts suitable for the hydrosilylation are finely divided platinum, chloroplatinic acid and its alcoholic, aldehydic or ketonic complex compounds, olefinic platinum complexes, platinum-divinyltetramethyldiisosiloxane, rhodium trichloride, iridium trichloride, ruthenium trichloride or iron trichloride, palladium dichloride or titanium tetrachloride, and complex compounds formed as intermediates between the compounds recited and alcohols, ketones or aldehydes. One particularly preferred example is the so-called Karstedt catalyst, platinum-divinyltetramethyldiisosiloxane. This catalyst can either be employed as a solution or be formed in situ by reduction and complexation from hexachloroplatinic acid and divinyltetramethyl-disiloxane.

Based on the olefinic groups to be reacted, the catalysts are employed in a range between $10^{-2}$ and $10^{-7}$ mol %—preferably between $10^{-4}$ and $10^{-6}$.

Less than 20% of the overall weight of the block copolymers of composition ABA, preferably less than 10%, are made up of A blocks.

ABA triblock copolymers can be equated in turn with 5-block copolymers of composition ACBCA. With these block copolymers being characterized in that the composition of the C blocks corresponds to the composition of the non-olefinically-functionalized fraction in the A blocks.

Block A is composed of a maximum of 4 olefinically functionalized monomers, from the group of olefinically functionalized (meth)acrylates. Block B contains no additional olefinically functionalized (meth)acrylates.

The (meth)acrylate notation stands for the esters of (meth)acrylic acid and here denotes not only methacrylate, such as methyl methacrylate, ethyl methacrylate, etc., for example, but also acrylate, such as methyl acrylate, ethyl acrylate, etc., for example, and also mixtures of both.

Moreover, a process has been developed for preparing block copolymers of composition ABA. Using a specific form of living polymerization, that of atom transfer radical polymerization (ATRP), it is possible to incorporate well-controlled compositions, architectures and defined functionalities into a polymer.

It has been found that through the use of a bifunctional initiator it is possible to construct an ABA or ACBCA structure in a controlled fashion.

The comonomers introduced for the functionalization of the outer segments are notable for the fact that they contain two unsaturated, free-radically polymerizable groups. Additionally they are distinguished by the fact that these two free-radically polymerizable groups are different and possess different polymerization activities. Preference is given to (meth)acrylates which carry an additional olefinic functionality. With particular preference they are selected from the group of the (meth)acrylic esters of aliphatic, unsaturated alcohols. These alcohols may be linear, branched or cycloaliphatic and may have been prepared starting from unsaturated alcohols having 2-36 carbon atoms. Especially preferred examples are allyl methacrylate and allyl acrylate.

It is advantageous that the monomers employed for the functionalization are polymerized without the occurrence of crosslinking reactions.

The preparation of a block copolymer of the invention is therefore realized by the copolymerization of monomers which are such that one unsaturated group is of this relatively (meth)acrylatic nature and the second is of a relatively olefinic nature. One example of such a monomer is allyl methacrylate (AMA), which is also described in the examples. Like many monomers of this kind, allyl methacrylate is described and used almost exclusively as a crosslinker. This is also true for its polymerization by means of ATRP. A description of the ATRP bulk polymerization of AMA can be read for example in Paris, de la Fuente (J. of Polymer Science: Part A Polymer Chemistry; 43, pp. 2395-2406; 2004)$_m$. A review of the often-described free-radical emulsion polymerization with simultaneous crosslinking by means of incorporation of AMA can be read in Matsumoto et al.; European Polymer J.; 35, pp. 1509-17; 1999.

Only Höcker and Keul have investigated, in two studies, a critical maximum fraction of allyl methacrylate in a mixture with styrene (macromolecules; 37, pp. 8923-8932; 2004) or with methyl methacrylate (MMA, in this respect see: Macromol. Chem. and Phys.; 205, pp. 2429-37; 2004). Explicitly for the case of the copolymerization with MMA, they describe a high crosslinking sensitivity of the system in the case of only relatively small AMA fractions, of more than 20% for example. In Moeller et al. (Polymer Preprints; 46, p. 341f; 2005) the same working group describes a corresponding application for ATRP-synthesized, AMA-containing methacrylate copolymers having a random distribution. The olefinically substituted polymers are used for coating metallic surfaces and are subsequently subjected to local crosslinking by activation, by means of photopolymerization, for example. A disadvantage as compared with the polymers of the invention is a close-knit crosslinking, which although entirely advantageous for the coating systems described may nevertheless lead to embrittlement of the end product in the case of formulation in sealants.

Monomers which are polymerized both in block A and in block B are selected from the group of (meth)acrylates such as, for example, alkyl(meth)acrylates of straight-chain, branched or cycloaliphatic alcohols having 1-40 carbon atoms, such as, for example, methyl(meth)acrylate, ethyl (meth)acrylate, n-butyl(meth)-acrylate, isobutyl(meth)acrylate, tert-butyl(meth)acrylate, pentyl(meth)acrylate, 2-ethylhexyl(meth)acrylate, stearyl(meth)acrylate, lauryl(meth)acrylate, cyclohexyl(meth)acrylate, isobornyl(meth)acrylate; aryl(meth)acrylates such as, for example, benzyl (meth)acrylate or phenyl(meth)acrylate which may in each case have unsubstituted or mono- to tetra-substituted aryl radicals; other aromatically substituted (meth)acrylates such as, for example, naphthyl(meth)acrylate; mono(meth)acrylates of ethers, polyethylene glycols, polypropylene glycols or mixtures thereof having 5-80 carbon atoms, such as, for example, tetrahydrofurfuryl methacrylate, methoxy(m) ethoxyethyl methacrylate, 1-butoxypropyl methacrylate, cyclo-hexyloxymethyl methacrylate, benzyloxymethyl meth-acrylate, furfuryl methacrylate, 2-butoxyethyl meth-acrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether(meth)acrylate and poly(propylene glycol)methyl ether(meth)acrylate.

Besides the (meth)acrylates set out above it is possible for the compositions to be polymerized also to contain further unsaturated monomers which are copolymerizable with the aforementioned (meth)acrylates and by means of ATRP. These include, among others, 1-alkenes, such as 1-hexene, 1-heptene, branched alkenes such as, for example, vinylcyclohexane, 3,3-dimethyl-1-propene, 3-methyl-1-diisobutylene, 4-methyl-1-pentene, acrylonitrile, vinyl esters such as vinyl acetate, styrene, substituted styrenes with an alkyl substituent on the vinyl group, such as α-methylstyrene and α-ethylstyrene, substituted styrenes with one or more alkyl substituents on the ring such as vinyltoluene and p-methylstyrene, halogenated styrenes such as for example, monochlorostyrenes, dichloro-styrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, 9-vinylcarbazole, 3-vinylcarbazole, 4-vinylcarbazole, 2-methyl-1-vinylimidazole, vinyloxolan, vinylfuran, vinylthiophene, vinylthiolane, vinyl-thiazoles, vinyloxazoles and isoprenyl ethers; maleic acid derivatives, such as, for example, maleic anhydride, maleimide, methylmaleimide and dienes such as divinylbenzene, for example, and also, in the A blocks, the respective hydroxy-functionalized and/or amino-functionalized and/or mercapto-functionalized compounds. Furthermore, these copolymers may also be prepared such that they have a hydroxyl and/or amino and/or mercapto functionality in one substituent. Examples of such monomers include vinylpiperidine, 1-vinylimidazole, N-vinylpyrrolidone, 2-vinylpyrrolidone, N-vinylpyrrolidine, 3-vinylpyrrolidine, N-vinyl-caprolactam, N-vinylbutyrolactam, hydrogenated vinyl-thiazoles and hydrogenated vinyloxazoles. Particular preference is given to copolymerizing vinyl esters, vinyl ethers, fumarates, maleates, styrenes or acrylonitriles with the A blocks and/or B blocks.

The process can be carried out in any desired halogen-free solvents. Preference is given to toluene, xylene, $H_2O$; acetates, preferably butyl acetate, ethyl acetate, propyl acetate; ketones, preferably ethyl methyl ketone, acetone; ethers; aliphatics, preferably pentane, hexane, biodiesel, but also plasticizers such as low-molecular-mass polypropylene glycols or phthalates.

The block copolymers of composition ABA are prepared by means of sequential polymerization.

Besides solution polymerization the ATRP can also be carried out as emulsion, miniemulsion, microemulsion, suspension or bulk polymerization.

The polymerization can be carried out under atmospheric, subatmospheric or superatmospheric pressure. The temperature of polymerization is also not critical. In general, however, it is situated in the range from −20° C. to 200° C., preferably from 0° C. to 130° C. and with particular preference from 50° C. to 120° C.

The polymer of the invention preferably has a number-average molecular weight of between 5000 g/mol and 100 000 g/mol, with particular preference ≦50 000 g/mol and with very particular preference between 7500 g/mol and 25 000 g/mol.

It has been found that the molecular weight distribution is below 1.6, preferably below 1.4 and ideally below 1.3.

As bifunctional initiators there can be $RO_2C$—CHX—$(CH_2)_n$—CHX—$CO_2R$, $RO_2C$—$C(CH_3)X$—$(CH_2)_n$—$C(CH_3)X$—$CO_2R$, $RO_2C$—$CX_2$—$(CH_2)_n$—$CX_2$—$CO_2R$, $RC(O)$—CHX—$(CH_2)_n$—CHX—$C(O)R$, $RC(O)$—$C(CH_3)X$—$(CH_2)$—$C(CH_3)X$—$C(O)R$, $RC(O)$—$CX_2$—$(CH_2)_n$—$CX_2$—$C(O)R$, $XCH_2$—$CO_2$—$(CH_2)_n$—$OC(O)CH_2X$, $CH_3CHX$—$CO_2$—$(CH_2)_n$—$OC(O)CHXCH_3$, $(CH_3)_2CX$—$CO_2$—$(CH_2)_n$—$OC(O)CX(CH_3)_2$, $X_2CH$—$CO_2$—$(CH_2)_n$—$OC(O)CHX_2$, $CH_3CX_2$—$CO_2$—$(CH_2)_n$—$OC(O)CX_2CH_3$, $XCH_2C(O)C(O)CH_2X$, $CH_3CHXC(O)C(O)CHXCH_3$, $XC(CH_3)_2C(O)C(O)CX(CH_3)_2$, $X_2CHC(O)C(O)CHX_2$, $CH_3CX_2C(O)C(O)CX_2CH_3$, $XCH_2$—$C(O)$—$CH_2X$, $CH_3$—CHX—$C(O)$—CHX—$CH_3$, $CX(CH_3)_2$—$C(O)$—$CX(CH_3)_2$, $X_2CH$—$C(O)$—$CHX_2$, $C_6H_5$—CHX—$(CH_2)_n$—CHX—$C_6H_5$, $C_6H_5$—$CX_2$—$(CH_2)$—$CX_2$—$C_6H_5$, $C_6H_5$—$CX_2$-$(CH_2)$—$CX_2$—$C_6H_5$, o-, m- or p-$XCH_2$-Ph-$CH_2X$, o-, m- or p-$CH_3CHX$-Ph-$CHXCH_3$, o-, m- or p-$(CH_3)_2CX$-Ph-$CX(CH_3)_2$, o-, m- or p-$CH_3CX_2$-Ph-$CX_2CH_3$, o-, m- or p-$X_2CH$-Ph-$CHX_2$, O—, m- or p-$XCH_2$—$CO_2$-Ph-OC(O)$CH_2X$, o-, m- or p-$CH_3CHX$—$CO_2$-Ph-OC(O)$CHXCH_3$, o-, m- or p-$(CH_3)_2CX$—$CO_2$-Ph-OC(O)$CX(CH_3)_2$, $CH_3CX_2$—$CO_2$-Ph-OC(O)$CX_2CH_3$, o-, m- or p-$X_2CH$—$CO_2$-Ph-OC(O)$CHX_2$ or o-, m- or p-$XSO_2$-Ph-$SO_2X$ (X stands for chlorine, bromine or iodine; Ph stands for phenylene ($C_6H_4$); R represents an aliphatic radical of 1 to 20 carbon atoms, which may be linear, branched or else cyclic in structure, may be saturated or mono- or polyunsaturated and may contain one or more aromatics or else is aromatic-free, and n is a number between 0 and 20). Preference is given to using 1,4-butanediol di(2-bromo-2-methylpropionate), 1,2-ethylene glycol di(2-bromo-2-methylpropionate), diethyl 2,5-dibromo-adipate or diethyl 2,3-dibromomaleate. The ratio of initiator to monomer gives the later molecular weight, provided that all of the monomer is reacted.

Catalysts for ATRP are set out in Chem. Rev. 2001, 101, 2921. The description is predominantly of copper complexes—among others, however, compounds of iron, of rhodium, of platinum, of ruthenium or of nickel are employed. In general it is possible to use any transition metal compounds which with the initiator, or with the polymer chain which has a transferable atomic group, are able to form a redox cycle. Copper can be supplied to the system for this purpose, for example, starting from $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

One alternative to the ATRP described is represented by a variant of it: in so-called reverse ATRP, compounds in higher oxidation states can be used, such as $CuBr_2$, $CuCl_2$, CuO, $CrCl_3$, $Fe_2O_3$ or $FeBr_3$, for example. In these cases the reaction can be initiated by means of conventional free-radical initiators such as, for example, AIBN. In this case the transition metal compounds are first reduced, since they are reacted with the radicals generated from the conventional free-radical initiators. Reverse ATRP has been described by, among others, Wang and Mayjaszewski in Macromolecules (1995), vol. 28, p. 7572 ff.

One variant of reverse ATRP is represented by the additional use of metals in the zero oxidation state. As a result of an assumed comproportionation with the transition metal compounds in the higher oxidation state, an acceleration is brought about in the reaction rate. This process is described in more detail in WO 98/40415.

The molar ratio of transition metal to bifunctional initiator is generally situated in the range from 0.02:1 to 20:1, preferably in the range from 0.02:1 to 6:1 and with particular preference in the range from 0.2:1 to 4:1, without any intention hereby to impose any restriction.

In order to increase the solubility of the metals in organic solvents and at the same time to prevent the formation of stable and hence polymerization-inert organometallic compounds, ligands are added to the system. Additionally the ligands facilitate the abstraction of the transferable atomic group by the transition metal compound. A listing of known ligands is found for example in WO 97/18247, WO 97/47661 or WO 98/40415. As a coordinative constituent, the compounds used as ligand usually contain one or more nitrogen, oxygen, phosphorus and/or sulphur atoms. Particular preference is given in this context to nitrogen compounds. Very particular preference is enjoyed by nitrogen-containing chelate ligands. Examples that may be given include 2,2'-bipyridine, N,N,N',N'',N''-pentamethyldiethylenetriamine (PMDETA), tris(2-aminoethyl)amine (TREN), N,N,N',N'-tetramethyl-ethylenediamine or 1,1,4,7,10,10-hexamethyltriethylene-tetramine. Valuable indicators relating to the selection and combination of the individual components are found by the skilled person in WO 98/40415.

These ligands may form coordination compounds in situ with the metal compounds or they may first be prepared as coordination compounds and then introduced into the reaction mixture.

The ratio of ligand (L) to transition metal is dependent on the density of the ligand and on the coordination number of the transition metal (M). In general the molar ratio is situated in the range 100:1 to 0.1:1, preferably 6.1 to 0.1:1 and with particular preference 3:1 to 1:1, without any intention hereby to impose any restriction.

A broad field of application is produced for these products. The selection of the use examples is not such as to restrict the use of the polymers of the invention. The examples are intended merely to serve as random samples of the broad functional capacity of the polymers described. Block copolymers of the ABA composition are employed preferably as prepolymer for a further reaction of the olefinic groups—such as a hydrosilylation or a hydroformulation, for example. The prepolymers can be crosslinked with any desired polymers.

Further possible applications, which are not described further, include use as prepolymer for the construction of high molecular mass block structures or elastomers. The preferred applications for the block copolymers of the invention with ABA composition and ≦4 olefinic groups in the individual A blocks are to be found in reactive hot-melt adhesives or in adhesive bonding compositions. Additional appropriate uses are in sealants for applications in the fields of automotive engineering, shipbuilding, container construction, mechanical engineering and aircraft engineering, and also in the electrical industry and in the building of domestic appliances. A further field of application is that of sealants for building applications or heat-sealing applications.

A further advantage of the block copolymers is the colourlessness and the odourlessness of the product produced.

With the new binders it is possible to prepare one-component and two-component elastomers for example for sealant formulations in building applications. Typical ingredients of a formulation are the binder, solvents, fillers, pigments, plasticizers, stabilizing additives, water scavengers, adhesion promoters, thixotropic agents, crosslinking catalysts, tackifiers, etc.

In order to reduce the viscosity it is possible to use solvents, examples being aromatic hydrocarbons (e.g. toluene, xylene, etc.), esters (e.g. ethyl acetate, butyl acetate, amyl acetate, Cellosolve acetate, etc.), ketones (e.g. methyl ethyl ketone, methyl isobutyl ketone, diisobutyl ketone, etc.), etc. The solvent may be added as early as during the free-radical polymerization.

Crosslinking catalysts for hydrosilylated binders in a formulation for example with corresponding polyurethanes are the common organic tin, lead, mercury and bismuth catalysts, examples being dibutyltin dilaurate (e.g. from BNT Chemicals GmbH), dibutyltin diacetate, dibutyltin diketonate (e.g. Metatin 740 from Acima/Rohm+Haas), dibutyltin dimaleate, tin naphthenate, etc. It is also possible to use reaction products of organic tin compounds, such as dibutyltin dilaurate, with silicic esters (e.g. DYNASIL A and 40), as crosslinking catalysts. Also, in addition, titanates (e.g. tetrabutyl titanate, tetrapropyl titanate, etc.), zirconates (e.g. tetrabutyl zirconate, etc.), amines (e.g. butylamine, diethanolamine, octyl-amine, morpholine, 1,3-diazabicyclo[5.4.6]undec-7-ene (DBU), etc.) and/or their carboxylic salts, low molecular mass polyamides, amino organosilanes, sulphonic acid derivatives, and mixtures thereof. The fraction of the crosslinking catalyst in the formulation is preferably 0.01 to 20 parts per 100 parts of binder, with particular preference 0.01 to 10 parts.

The block copolymers of composition ABA with ≦4 olefinic groups in the individual A blocks can be converted into a further functionality for further reaction of the olefinic groups by means of an addition reaction or oxidation reaction. By way of example it is possible to carry out hydrosilylations. The reaction products obtained by further reactions of the olefinic groups have a broad field of application. The preferred applications are to be found in reactive hot-melt adhesives or in adhesive bonding compositions. Possible uses also present themselves in sealants for applications in the fields of automotive engineering, shipbuilding, container construction, mechanical engineering and aircraft engineering, and also in the electrical industry and in the building of domestic appliances. A further field of application is in sealants for building applications or heat-sealing applications.

The examples given below are given for the purpose of improved illustration of the present invention, but are not apt to restrict the invention to the features disclosed herein.

EXAMPLES

Example 1

A jacketed vessel equipped with stirrer, thermometer, reflux condenser, nitrogen introduction tube and dropping funnel was charged under an $N_2$ atmosphere with monomer 1a (precise identification and quantity in Table 1), butyl acetate, copper(I) oxide and N,N,N',N'',N''-pentamethyldiethylenetriamine (PMDETA). The solution is stirred at 60° C. for 15 minutes. Subsequently, at the same temperature, 1,4-butanediol di(2-bromo-2-methylpropionate) (BDBIB) initiator in solution in butyl acetate is added dropwise. After the polymerization time of three hours a sample is taken for determination of the average molar weight $M_n$ (by means of SEC) and a mixture of monomer 2a and monomer 3a (precise identification and quantity in Table 1) is added. The mixture is polymerized to an anticipated conversion of at least 98% and is terminated by exposure to atmospheric oxygen and the optional addition of methylene chloride. The solution is worked up by filtration over silica gel and the subsequent removal of volatile constituents by means of distillation. The average molecular weight is determined, finally, by SEC measurements. The fraction of incorporated monomer 3a is quantified by means of $^1$H NMR measurements.

Example 2

In the same way as in Example 1, monomers 1b, 2b and 3b (precise identification and quantity in Table 1) are used.

Example 3

In the same way as in Example 1, monomers 1c, 2c and 3c (precise identification and quantity in Table 1) are used.

Example 4

In the same way as in Example 1, monomers 1d, 2d and 3d (precise identification and quantity in Table 1) are used.

TABLE 1

| Example | 1 | 2 | 3 | 4 |
|---|---|---|---|---|
| Monomer 1 | 1a) MMA | 1b) n-BA | 1c) n-BA | 1d) MMA |
| Amount | 81.07 g | 85.09 g | 81.99 g | 78.06 g |
| Monomer 2 | 2a) MMA | 2b) MMA | 2c) n-BA | 2d) n-BA |
| Amount | 14.45 g | 11.44 g | 14.67 g | 17.87 g |
| Monomer 3 | 3a) AMA | 3b) AMA | 3c) AMA | 3d) AMA |
| Amount | 4.48 g | 3.47 g | 3.35 g | 4.08 g |
| Initiator amount | 2.95 g | 2.42 g | 2.33 g | 1.84 g |
| $M_n$ (1st stage) | 8500 | 12 800 | 11 900 | 7400 |
| $M_n$ (end product) | 9000 | 14 500 | 13 500 | 8600 |
| D | 1.32 | 1.29 | 1.32 | 1.25 |

MMA = methyl methacrylate; n-BA = n-butyl acrylate, AMA = allyl methacrylate

Example 5

A jacketed vessel equipped with stirrer, thermometer, reflux condenser, nitrogen introduction tube and dropping funnel was charged under an $N_2$ atmosphere with monomer Ia (precise identification and quantity in Table 2), butyl acetate, copper(I) oxide and PMDETA. The solution is stirred at 60° C. for 15 minutes. Subsequently, at the same temperature, 1,4-butanediol di(2-bromo-2-methylpropionate) (BDBIB) initiator in solution in butyl acetate is added dropwise. After a polymerization time of 3 hours a sample is taken for determination of the average molar weight $M_n$ (by means of SEC) and monomer IIa (precise identification and quantity in Table 2) is added. After a calculated 98% conversion, finally, a mixture of monomer IIa' and monomer IIIa (precise identification and quantity in Table 2) is added. The mixture is polymerized to an anticipated conversion of at least 98% and is terminated by exposure to atmospheric oxygen and the optional addition of methylene chloride. The solution is worked up by filtration over silica gel and the subsequent removal of volatile constituents by means of distillation. The average molecular weight is determined, finally, by SEC measurements. The fraction of incorporated monomer IIIa is quantified by means of $^1$H NMR measurements.

TABLE 2

| Example | 5 |
|---|---|
| Monomer I | Ia) n-BA |
| Amount | 61.05 g |
| Monomer II | IIa) MMA |
| Amount | 16.89 g |
| Monomer II' | IIa') MMA |
| Amount | 16.89 g |
| Monomer III | IIIa) AMA |
| Amount | 4.98 g |
| Initiator amount | 3.47 g |
| $M_n$ (1st stage) | 8800 |
| $M_n$ (end product) | 11 200 |
| D | 1.36 |

MMA = methyl methacrylate; n-BA = n-butyl acrylate, AMA = allyl methacrylate

Example 6

Comparative Example 1

Synthesis of Non-Functionalized ABA Triblock Copolymers

General instructions for synthesizing the described ABA triblock copolymers by means of ATRP:

A jacketed vessel equipped with stirrer, thermometer, reflux condenser, nitrogen introduction tube and dropping funnel was charged under an $N_2$ atmosphere with monomer C1a (precise identification and quantity in Table 3), butyl acetate, copper(I) oxide and PMDETA. The solution is stirred at 60° C. for 15 minutes. Subsequently, at the same temperature, 1,4-butanediol di(2-bromo-2-methylpropionate) (BDBIB) initiator in solution in butyl acetate is added dropwise. After the polymerization time $t_1$ of 3 hours a sample is taken for determination of the average molar weight $M_n$ (by means of SEC) and monomer C2a (precise identification and quantity in Table 3) is added. The mixture is polymerized to an anticipated conversion of at least 98% and is terminated by exposure to atmospheric oxygen and the optional addition of methylene chloride. The solution is worked up by filtration over silica gel and the subsequent removal of volatile constituents by means of distillation. The average molecular weight is determined, finally, by SEC measurements.

Example 7

Comparative Example 2

In the same way as in Example 6, monomers C1b and C2b (precise identification and quantity in Table 3) are used.

Example 8

Comparative Example 3

In the same way as in Example 6, monomers C1c and C2c (precise identification and quantity in Table 3) are used.

Example 9

Comparative Example 4

In the same way as in Example 6, monomers C1d and C2d (precise identification and quantity in Table 3) are used.

TABLE 3

| Example | 6 | 7 | 8 | 9 |
|---|---|---|---|---|
| Monomer C1 | C1a) MMA | C1b) n-BA | C1c) n-BA | C1d) MMA |
| Amount | 84.88 g | 88.15 g | 84.47 g | 74.45 g |
| Monomer C2 | C2a) MMA | C2b) MMA | C2c) n-BA | C2d) n-BA |
| Amount | 15.12 g | 11.85 g | 15.13 g | 25.55 g |
| Initiator amount | 3.09 g | 2.51 g | 2.41 g | 2.72 g |
| $M_n$ (1st stage) | 7600 | 12 300 | 12 900 | 9200 |
| $M_n$ (end product) | 8100 | 14 500 | 13 800 | 8400 |
| D | 1.25 | 1.29 | 1.26 | 1.23 |

MMA = methyl methacrylate; n-BA = n-butyl acrylate, AMA = allyl methacrylate

The invention claimed is:

1. A process for preparing a block copolymer composition, ABA, comprising sequentially:
   polymerizing by atom transfer radical polymerization (ATRP) monomers, comprising monomers selected from the group consisting of a (meth)acrylate and a mixture of (meth)acrylates, with the proviso that no monomer has additional olefinic functionality, to obtain block B, and then
   polymerizing by atom transfer radical polymerization (ATRP), monomers, comprising monomers selected from the group consisting of a methacrylate, an olefinically functionalized (meth)acrylate and a mixture of a methacrylate and an olefinically functionalized (meth)acrylate, to obtain blocks A which each comprise from 1 to ≦4 olefinic groups,
   wherein
   each polymerizing reaction is in the presence of an initiator and of a catalyst in a halogen-free solvent,
   the initiator for the polymerizing to obtain the B block is a bifunctional initiator, and
   a molecular weight of the ABA block copolymer is between 5000 g/mol and 25 000 g/mol.

2. The process for preparing a block copolymer composition according to claim 1, wherein the bifunctional initiator is at least one selected from the group consisting of 1,4-butanediol di(2-bromo-2-methylpropionate), 1,2-ethylene glycol di(2-bromo-2-methylpropionate), diethyl 2,5-dibromoadipate and diethyl 2,3-dibromomaleate.

3. The process for preparing a block copolymer composition according to claim 1, wherein the catalyst is at least one transition metal compound.

4. The process for preparing a block copolymer composition according to claim 3, wherein the catalyst is at least one compound selected from the group consisting of copper, iron, rhodium, platinum, ruthenium and nickel.

5. The process for preparing a block copolymer composition according to claim 4, wherein the catalyst is a copper compound.

6. The process for preparing a block copolymer composition according to claim 3, further comprising contacting the catalyst with a nitrogen, oxygen, sulphur or phosphorus compound, or a mixture thereof, which is able to form one or more coordinative bonds with the transition metal catalyst to form a metal-ligand complex.

7. The process for preparing a block copolymer composition according to claim 6, wherein the ligand is at least one N-containing chelate ligand.

8. The process for preparing a block copolymer composition according to claim 7, wherein the ligand is at least one selected from the group consisting of 2,2'-bipyridine, N,N,N', N'',N''-pentamethyldiethylenetriamine (PMDETA), tris(2-aminoethyl)amine (TREN), N,N,N',N'-tetramethylethylenediamine and 1,1,4,7,10,10-hexamethyltriethylenetetramine.

9. The process for preparing a block copolymer composition according to claim 1, wherein the olefinically functionalized (meth)acrylate comonomer comprises a carbon-carbon double bond having a different polymerization activity such that cross-linking does not occur during the polymerization.

10. The process for preparing a block copolymer according to claim 1, wherein a molecular weight distribution of the block copolymer is less than 1.6.

11. The process for preparing a block copolymer composition according to claim 1, wherein a molecular weight distribution of the block copolymer is less than 1.4.

* * * * *